US006754956B1

United States Patent
Tomko et al.

(10) Patent No.: US 6,754,956 B1
(45) Date of Patent: Jun. 29, 2004

(54) METHODS FOR MANUFACTURING A NOZZLE BOX ASSEMBLY FOR A STEAM TURBINE

(75) Inventors: Andrew John Tomko, Glenville, NY (US); Charles T. O'Clair, Waterford, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/309,086

(22) Filed: Dec. 4, 2002

(51) Int. Cl.[7] .................................................. B23P 15/00
(52) U.S. Cl. ........................ 29/889.2; 29/428; 29/559
(58) Field of Search ............................. 29/889.2, 428, 29/559; 239/548, 556, 558; 415/191, 208.2

(56) References Cited

U.S. PATENT DOCUMENTS

| | | | | |
|---|---|---|---|---|
| 5,392,513 A | * | 2/1995 | Mazzola et al. | 29/889.1 |
| 6,196,793 B1 | * | 3/2001 | Braaten | 415/191 |
| 6,631,858 B1 | * | 10/2003 | Farineau et al. | 239/548 |

* cited by examiner

Primary Examiner—I Cuda Rosenbaum
(74) Attorney, Agent, or Firm—Nixon & Vanderhye

(57) ABSTRACT

Halves of a torus, bridge ring and nozzle are fitted up on tapered fits and clamped one to the other. Weld preps are performed on the torus and nozzle surfaces to be welded. Weld material is applied along the inner and outer radii, initially in a root pass to consume the metal, in subsequent intermediate passes to build up the base metal and finally in a rapid deposition of weld material, e.g., using submerged arc process. The nozzle box assembly half is then stress-relieved, X-rayed and machine-finished.

22 Claims, 4 Drawing Sheets

METHODS FOR MANUFACTURING A NOZZLE BOX ASSEMBLY FOR A STEAM TURBINE

BACKGROUND OF THE INVENTION

The present invention relates to methods for fabricating a nozzle box assembly for a steam turbine and particularly relates to a process for welding component parts of a nozzle box assembly to one another with resulting reductions in cycle time and manufacturing costs.

A nozzle box assembly for a steam turbine is essentially comprised of three components: a torus, a bridge ring and a nozzle. These major components are very high strength very high temperature resistant forgings. Each of the components is initially formed in 180° segments. After the components are assembled (welded) to form two (upper and lower) unitary 180° nozzle box halves, the halves are joined one to the other along a horizontal midline to form a complete annular nozzle box assembly for a steam turbine. Each completed nozzle box half includes one or more, preferably two, steam inlets formed integrally with the torus. These inlets extend from the torus in a plane normal to the axis of rotation of the turbine and hence lie close to and in the plane of the torus itself. In a completed turbine, the inlets receive steam from a suitable source for flow into the torus. The steam changes direction to a generally axial flow for flow through the annular opening of the bridging ring and into the nozzles of the nozzle plate which include air foil vanes for directing the steam flow to subsequent buckets. It will be appreciated that the bridge ring is welded, as discussed below, to the torus about the radially inner and outer margins of the torus. The bridge ring serves as a buttress to hold the margins of the torus together against the very high pressures of the steam tending to separate the margins from one another. The nozzle plate is in turn welded to the bridge ring on a side thereof remote from the torus.

In a prior manufacturing method for forming the nozzle box assembly, four major welds were required. The first and second welds were formed on the inner and outer radius between margins of the torus and the bridge ring to secure those parts to one another. Third and fourth welds were also formed between the bridge ring and nozzle plate along respective inner and outer radii to secure those parts to one another. The bridge ring was originally provided with extra metal along a side thereof remote from the torus. This extra metal not only closed off the opening in the forged torus but afforded extra mass to minimize thermal distortion during the welding process. The extra mass of metal was later machined from the bridge ring opening up the semi-circular opening from the torus through the bridge ring.

Initially, the bridge ring with the extra metal mass was fitted up to the torus on tapered surfaces, that registered the bridge ring to the torus. Prior to fitting up, however, weld prep was performed on each of the margins of the bridge ring and torus along inside and outside radii and inspected to insure that the weld prep was flat, level and true and met the requirements for the weld. Once the bridge ring and torus were assembled and clamped to one another, this subassembly was preheated to approximately 450–500° F. The preheat temperature was monitored to ensure the components obtained the desired temperature. Once the weld prep was validated and the torus and bridge ring were preheated, a small diameter electrode TIG welding process was used to consume the abutting portions of the bridge ring and torus in a root pass. That is, the first root pass melted the adjoining metal such that the two components became integral without any separation line thus forming a homogeneous piece. Additional passes by a hand TIG welding torch added further material which formed base material for the final weld. Once there was significant weld buildup, the welding process was changed to a submerged arc process for high weld deposition where weld buildup was effected quickly. The preheat temperature was maintained throughout the welding process. The welded assembly was immediately placed into a stress relieving oven for a predetermined time frame without allowing the materials to cool. Specifically, the welded torus and bridge ring were placed in an inert gas furnace and the temperature was raised to 1200° F. and above with a subsequent controlled cooling rate. This completed and cooled subassembly was then X-rayed to insure the integrity of the weld.

Assuming the weld passed the X-ray test, the extra metal mass of the bridge ring was machined thus machining off the heat sink and opening the torus. The torus-bridge ring subassembly and nozzle plate were then welded to one another along inner and outer radii utilizing a similar procedure. For example, weld prep for the bridge ring and nozzle plate was performed and validated and the components were aligned and clamped to one another. The clamped assembly was preheated to approximately 450° F. and a first root pass was made by TIG welding to consume the root and form a homogeneous assembly. An additional three or four passes using a hand-held TIG torch built up the base metal and that welding process was followed by a submerged arc welding process which rapidly added additional weld material. The assembly was stress relieved, X-rayed and machined to finish.

Apart from time and labor costs, the foregoing described process experienced unique problem associated with the weld prep and use of the welding equipment for joining the torus and bridge ring. The inlet snouts on the torus included projections which typically Interfered with the welding process. Particularly, the projections did not permit access of the welding tools to the radial outer weld between the bridge ring and torus. To afford access, a portion of the inlet snout material was removed to enable welding between the bridge ring and torus. Once the welding was complete, the previously removed snout material was restored to the torus by welding. This removal and later restoration of material involved substantial time and labor costs.

The foregoing described welding procedures to form the nozzle box assembly for a steam turbine were thus extensive, time consuming and very costly. The welds between the torus and bridge ring and between the nozzle plate and the bridge ring were necessarily performed at different times, the latter being performed only after completion of the former. As a consequence, the prior assembly procedure required four weld preps, two preheats, four welds, two stress relieves, two X-rays and twice the heavy-duty machining to produce the final nozzle box assembly. As a result, the fabrication of the nozzle box assembly often required approximately one year's time and used highly skilled welders and machinists.

BRIEF DESCRIPTION OF THE INVENTION

In accordance with a preferred embodiment of the present invention, substantial time and hence cost savings are realized in the fabrication of a nozzle box assembly by utilizing only two major welds necessitating only two weld preps, one preheat, one stress relief, one X-ray and one heavy-duty machining in order to assemble the torus, bridge ring and nozzle plate and form the final nozzle box assembly. The two major welds are along the inner radius and outer radius, respectively, and directly join the torus, bridge ring and nozzle plate to one another to form a unitary homogenous assembly. Additionally, the step of removing the extra mass of metal from the bridge ring subsequent to welding the bridge ring to the torus and prior to its securement to the nozzle plate is entirely eliminated. Also, the torus is modified about the margins of its inner and outer radius to provide an inwardly directed face or turn at each inner and outer radius. Thus, the torus prep area tapers inwardly along the margins toward the torus opening. The thickness of the bridge ring is reduced and the previously employed extra mass of metal material is entirely eliminated. The bridge ring is provided with robust positioning fits along opposite annular margins to fit with the torus and the nozzle plate respectively. Additionally, the outer radius of the nozzle plate adjacent the bridge ring has a substantially increased taper to provide additional welding access in the single outer weld prep area adjacent the snout of the torus. This eliminates the heretofore necessity of removing snout material to gain access for weld prep and the welding tools and then restoring the material once the welds have been completed.

To fabricate the nozzle box assembly in accordance with a preferred embodiment of the present invention, weld preps are performed on the nozzle plate and margins of the torus. The bridge ring is fitted to the torus about the opening and the nozzle plate is fitted to the bridge ring with precision fits. The assembly is then clamped tightly to one another in preparation for welding. The welding procedure is similar to the previously described welding procedure with respect to the prior nozzle box assembly except that only two major welds are required rather than four. Thus, once clamped, the three assembled components are preheated to approximately 450° F., root weld passes are performed to join the metal at the fit ups and additional passes are made to build up weld material. Once significant weld buildup is present, a submerged arc TIG welding process is employed to enable fast weld deposition. Once welding is completed the assembly is stress relieved without first cooling, and subsequent X-ray examination and final machining are performed.

In a preferred embodiment according to the present invention, there is provided a method of manufacturing a nozzle box assembly half for a turbine comprising the steps of (a) providing arcuate segments of a torus, a bridge ring and a nozzle plate, (b) clamping the torus and bridge ring segments to one another and the bridge ring and nozzle box segments to one another with the bridge ring segment between the torus and nozzle plate segments and (c) welding along inner and outer radii of the assembly and overlying the bridge ring segment to join directly the nozzle plate, bridge ring and torus segments to one another with the bridge ring segment therebetween.

In a further preferred embodiment according to the present invention, there is provided a method of manufacturing a nozzle box assembly half for a turbine comprising the steps of (a) providing semi-circular segments of a torus, a bridge ring and a nozzle plate, (b) fitting the torus and bridge ring segments to one another and the bridge ring and nozzle box segments to one another with the bridge ring segment between the torus and nozzle plate segments and (c) applying weld material along inner and outer radii of the assembly and overlying the bridge ring segment to directly join the nozzle plate, bridge ring and torus segments to one another with the bridge ring segment therebetween.

DETAILED DESCRIPTION OF THE INVENTION

Figure 1:
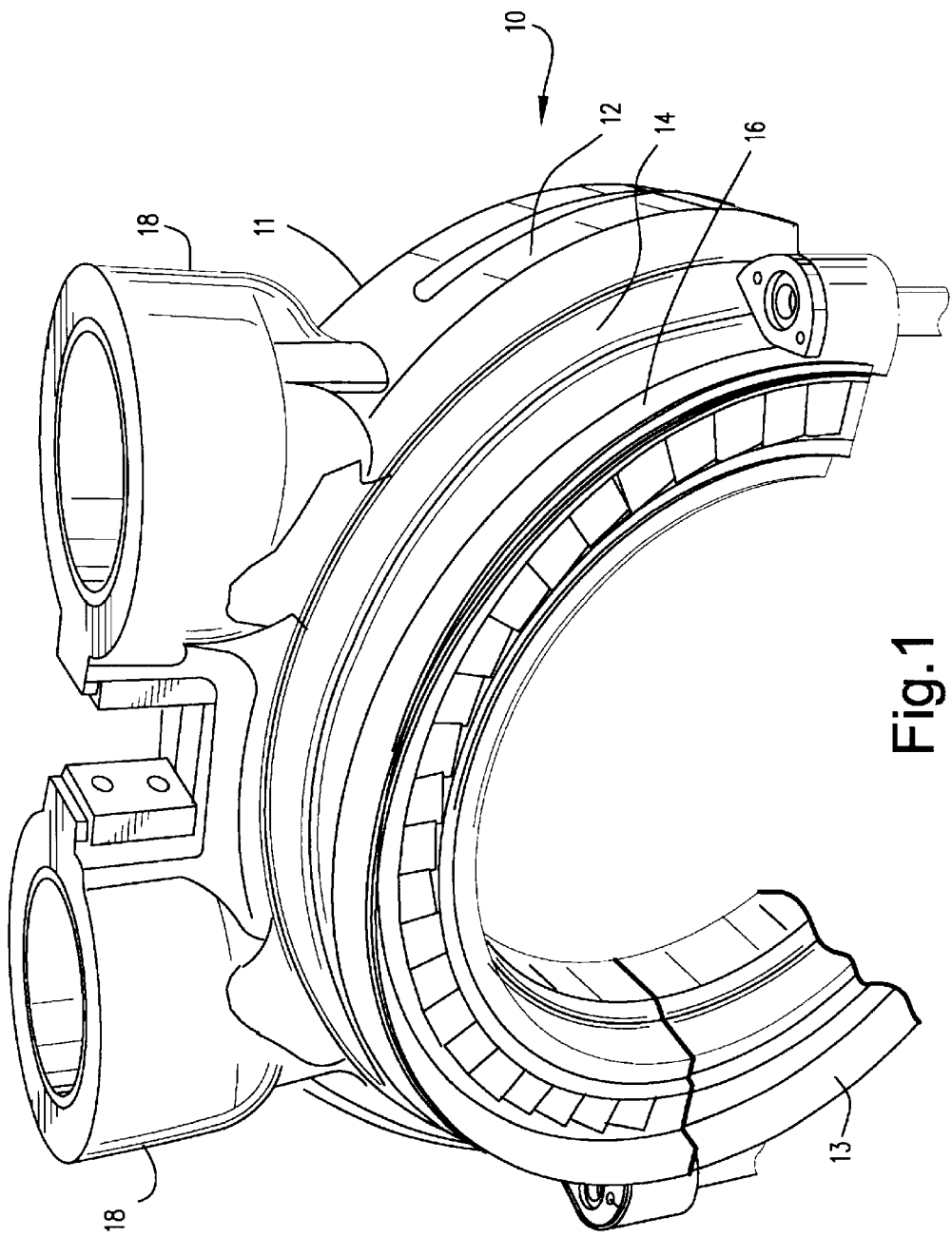
FIG. 1 is a perspective view of one half of a nozzle box assembly for a steam turbine constructed in accordance with a preferred embodiment of the present invention.

Referring now to the drawings, particularly to FIG. 1, there is illustrated a half of a nozzle box assembly, generally designated 10, which may be either an upper half 11 or a lower half 13. As illustrated, each nozzle box half includes portions of a torus 12, a bridge ring 14 and, finally, a nozzle 16. In the final nozzle box assembly, the portions of the torus, bridge ring and nozzle for each nozzle box assembly half are welded one to the other and essentially form an integral monolith. Also illustrated are steam inlets 18 forming part of an integral forging with torus 12. It will be appreciated that the illustrated nozzle box assembly half 11 is joined with a similar nozzle box assembly half along a horizontal midline whereby the two nozzle box assembly halves form a complete nozzle box assembly with four steam inlets, the torus, nozzles and bridge rings extending a complete 360°.

Figure 2:
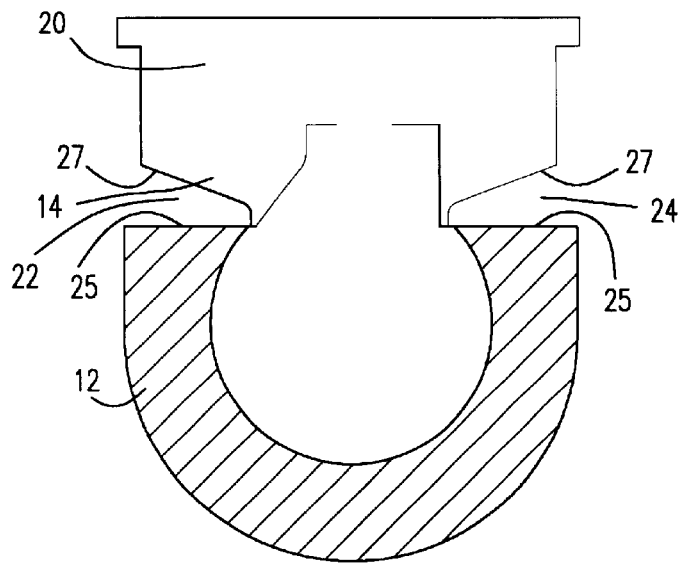
FIG. 2 is a schematic illustration of a prior art torus and bridge ring fit-up for welding.
Figure 3:
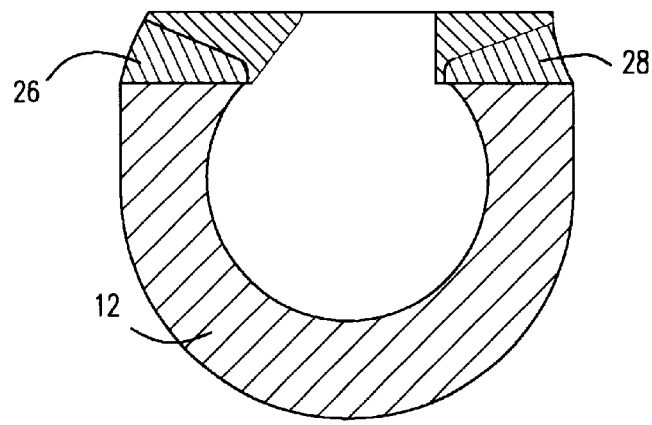
FIG. 3 is a view similar to FIG. 2 illustrating a further step in the prior art process of welding the torus and bridge ring.

As noted previously and referring to FIG. 2, a prior method of assembling the nozzle box assembly included fitting-up the torus and bridge ring halves in a semi-circular configuration and, as illustrated in FIG. 2, the bridge ring had an additional mass of metal 20 which was removed subsequent to welding but provided a heat sink during the welding process. The bridge ring and torus halves are fitted-up on tapered surfaces. From a review of FIG. 2, weld preps 25 and 27 were performed on surfaces of the torus 12 and bridge ring 14 halves along inner and outer radii 22 and 24, respectively. Once clamped together, the torus and bridge ring half subassembly was preheated to approximately 450–500° F., and a small diameter electrode TIG welding process was used to consume the abutting metal of the bridge ring and torus halves in a root pass. Additional passes by hand TIG welding torch added further weld material and a submerged arc process was used to provide high deposition of weld material to complete the two welds along the inner and outer radii 22 and 24, respectively. The welds were then stress-relieved, cooled and X-rayed to ensure the integrity of the welds. Subsequently, as illustrated in FIG. 3, the extra mass of material 20 of the bridge ring half was removed, leaving the remaining portion of the bridge ring half 14 welded to the torus 12 by inner and outer welds 26 and 28. For illustration purposes, the torus, bridge ring and nozzle halves as well as the welds therebetween are shown in drawing FIGS. 2–7 in cross-section. It will be appreciated, however, that the prior art assembly half and the final assembly according to the present invention are monolithic integral one-piece constructions without differentiation between initial materials and the welds.

Figure 4:
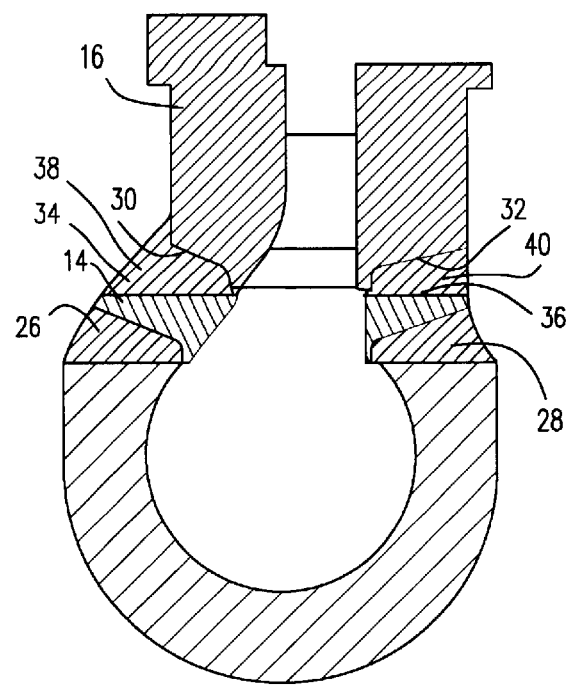
FIG. 4 is a view similar to FIG. 2 illustrating a further prior art step of welding the nozzle and bridge ring to one another.

Next, the nozzle half 16 was fitted-up on the bridge ring half 14 as illustrated in FIG. 4. Weld preps were also performed on each of the radially inner and outer surfaces of the bridge ring half 14 and nozzle half 16 along their inner and outer radii. Thus, the surfaces 30 and 32 of the nozzle half and surfaces 34 and 36 of the bridge ring half were prepared for welding. Once prepared, a similar procedure was undertaken to weld the nozzle and bridge ring halves to one another as the procedure for welding the torus and bridge ring halves to one another. First, a root pass was performed, which was followed by several welding passes by a hand-held TIG torch and, finally, by a submerged arc-welding process for rapid deposition of weld material, to form welds 38 and 40 along the inner and outer radii of the nozzle box assembly. Preheat, stress-relief and cooling steps were also performed.

Figure 5:
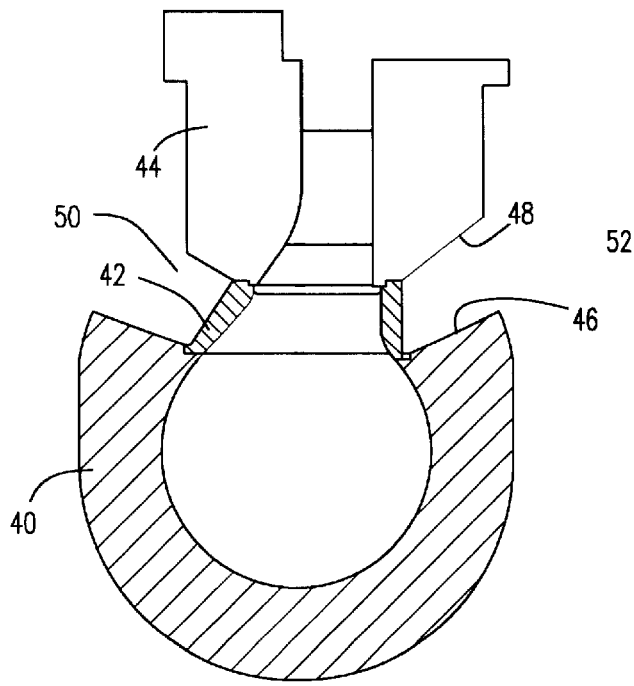
FIG. 5 is a schematic illustration of a fit-up for a torus, bridge ring and nozzle according to the present invention prior to welding.

Referring now to FIG. 5, there is illustrated in accordance with a preferred embodiment of the present invention a nozzle box assembly comprised of halves of a torus 40, a bridge ring 42 and nozzle 44 fit-up for assembly prior to welding. As in prior nozzle box assemblies, each of the torus, bridge ring and nozzle segments or halves 40, 42 and 44 are formed of high-strength steel forgings. In this form, however, the margins 46 of the torus half 40 are forged to provide semi-annular surfaces inclined toward the interior of the torus half 40. The bridge ring half 42 does not include the heavy mass of metal previously required and thus is semi-circular in shape, having a semi-circular opening between its radially inner and outer inclined side walls. The nozzle half 44 is similar to the prior nozzle half 16, except that the semi-circular inner margin 48 along the outer radius is formed at a comparatively sharper semi-annular face, for reasons discussed below. Because the torus bridge ring and nozzle halves are fitted up and clamped to one another, it will be appreciated from a review of FIG. 5 that only two major welds are required to manufacture the complete nozzle box assembly. One weld is along the inner radius 50 and the other weld along the outer radius 52. It will therefore be appreciated that only two weld preps are necessary, in contrast to the four weld preps required in the prior nozzle box construction. It will also be appreciated that further machining of the bridge ring half is not necessary since the bridge ring half is forged without the previously required additional mass of metal material. The margin 48 of the nozzle half is also angled at a steeper incline. By forming the margin 48 along the outer radius at the steeper angle, greater access to the welding tools is provided. It will be recalled that snout material had to have been previously removed and then added back subsequent to welding. The removal was necessary to gain welding access. By eliminating the need to remove material from the torus half prior to welding and, subsequent to welding, adding the material back to the nozzle, substantial savings in time and cost have been effected. Further, the torus, bridge ring and nozzle halves are fitted-up as illustrated in FIG. 5 with precision machine circular fits that interlock the assembly. These precision fits provide alignment and positioning of these components for welding. After the fit-up, as illustrated in FIG. 5, the three parts are clamped together, using suitable fixtures, not shown, for welding.

Figure 6:
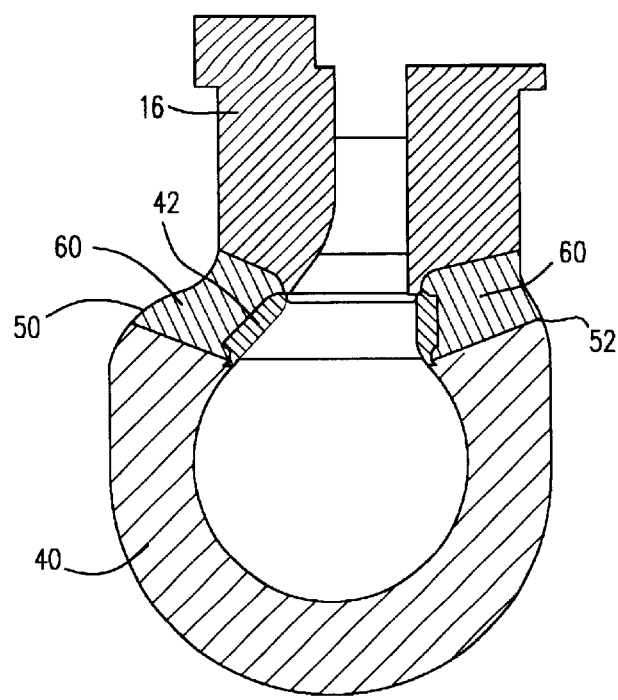
FIG. 6 is a view similar to FIG. 5 after completion of the weld.

To weld the torus, bridge ring and nozzle halves to one another, the clamped assembly is first preheated to approximately 450–500° F. When the metal is brought up to preheat temperature, a first root pass is made by TIG welding to consume the metal and form a homogeneous juncture between the torus and bridge ring halves and similarly between the bridge ring and nozzle halves. Additional passes are made to deposit further weld material, preferably using a hand-held TIG torch. When sufficient material has been built-up, the welding process is changed to a higher weld deposition process and, preferably, a submerged tungsten arc-welding process is used. As a consequence, weld material is built-up in the inner and outer radius gaps between the torus, bridge ring and nozzle halves. Once the full deposit of weld material 60 has been provided along each of the two welds along the inner and outer radii 50 and 52, respectively, the assembly is stress-relieved, X-rayed and machined to finish. It will be appreciated that the cross-section lines in FIGS. 6 and 7 are for illustrative purposes only and that the final nozzle box assembly half is a homogenous mass of metal in the configuration described and illustrated.

Figure 7:
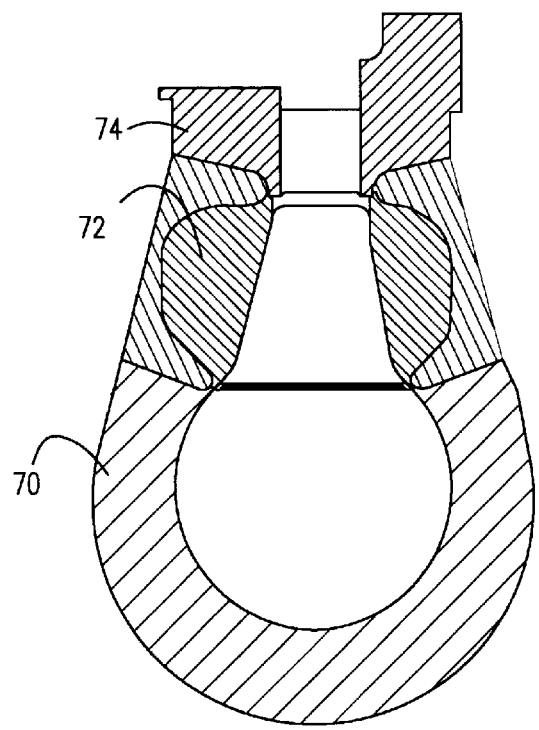
FIG. 7 is a view similar to FIG. 5 illustrating a different form of bridge ring and nozzle employing similar fit-ups and welding procedures as in FIG. 5.

Referring to FIG. 7, there is illustrated a similar fit-up of the halves of the torus 70, bridge ring 72 and nozzle 74. The differences reside in the different form of the halves of the bridge ring and nozzle. However, the welding procedure is the same as the welding procedure previously described with respect to the embodiment hereof illustrated in FIGS. 5 and 6. Again, the cross-hatching is used to identify the various parts of the assembly, although the final assembly is a monolithic integral homogenous mass of metal.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of manufacturing a nozzle box assembly half for a turbine comprising the steps of:
    (a) providing arcuate segments of a torus, a bridge ring and a nozzle;
    (b) clamping the torus, bridge ring and nozzle segments to one another with the bridge ring segment between the torus and nozzle segments to form an assembly thereof;
    (c) welding along inner and outer radii of the assembly and overlying the bridge ring segment to join directly the nozzle, bridge ring and torus segments to one another with the bridge ring segment therebetween.

2. A method according to claim 1 wherein step (b) includes fitting the bridge ring segment to the torus and nozzle segments along chamfered fits.

3. A method according to claim 1 including preheating the clamped segments prior to performing step (c).

4. A method according to claim 1 including performing weld preps on margins of the torus and nozzle segments prior to step (c).

5. A method according to claim 1 including performing an initial root pass weld to consume the material of the torus, bridge ring and nozzle segments at their joints prior to step (c).

6. A method according to claim 1 including preheating the clamped segments prior to performing step (c), and performing weld preps on margins of the torus and nozzle segments prior to step (c).

7. A method according to claim 6 including stress-relieving the segments subsequent to step (c).

8. A method according to claim 7 including X-raying the welds.

9. A method according to claim 1 including forming margins along the torus segment inclined inwardly toward the interior of the torus segment.

10. A method according to claim 9 including forming margins along the nozzle segment tapered away from nozzles of the nozzle segment.

11. A method according to claim 9 including forming one of the margins of the nozzle segment at an increased taper in comparison with the taper of another margin of the nozzle segment.

12. A method of manufacturing a nozzle box assembly half for a turbine comprising the steps of:

(a) providing semi-circular segments of a torus, a bridge ring and a nozzle;

(b) clamping the torus, bridge ring and nozzle segments to one another with the bridge ring segment between the torus and nozzle segments to form an assembly thereof;

(c) applying weld material along inner and outer radii of the assembly and overlying the bridge ring segment to directly join the nozzle, bridge ring and torus segments to one another with the bridge ring segment therebetween.

13. A method according to claim 12 wherein step (b) includes fitting the bridge ring segment to the torus and nozzle segments along chamfered fits.

14. A method according to claim 12 including preheating the clamped segments prior to performing step (c).

15. A method according to claim 12 including performing weld preps on margins of the torus and nozzle segments prior to step (c).

16. A method according to claim 12 including performing an initial root pass weld to consume the material of the torus, bridge ring and nozzle segments at their joints prior to step (c).

17. A method according to claim 12 including preheating the clamped segments prior to performing step (c), and performing weld preps on margins of the torus and nozzle segments prior to step (c).

18. A method according to claim 17 including stress-relieving the segments subsequent to step (c).

19. A method according to claim 18 including X-raying the welds.

20. A method according to claim 12 including forming margins along the torus segment inclined inwardly toward the interior of the torus segment.

21. A method according to claim 20 including forming margins along the nozzle segment tapered away from nozzles of the nozzle segment.

22. A method according to claim 20 including forming one of the margins of the nozzle segment at an increased taper in comparison with the taper of another margin of the nozzle segment.

* * * * *